Dec. 20, 1966  W. A. HARDY  3,293,565
LASER IMAGING EMPLOYING A DEGENERATE OPTICAL CAVITY
Filed Dec. 31, 1963  3 Sheets-Sheet 1

INVENTOR
WILTON A. HARDY
BY George Baron
ATTORNEY

Dec. 20, 1966     W. A. HARDY     3,293,565
LASER IMAGING EMPLOYING A DEGENERATE OPTICAL CAVITY
Filed Dec. 31, 1963     3 Sheets-Sheet 3

United States Patent Office 3,293,565
Patented Dec. 20, 1966

3,293,565
LASER IMAGING EMPLOYING A DEGENERATE
OPTICAL CAVITY
Wilton A. Hardy, Ossining, N.Y., assignor to International
Business Machines Corporation, New York, N.Y., a
corporation of New York
Filed Dec. 31, 1963, Ser. No. 334,702
1 Claim. (Cl. 331—94.5)

This invention relates to maser optical cavities in general, and more particularly to a novel way for controlling the modes of such cavities so as to provide imaging of objects placed within the lasing cavity.

Reflecting systems forming optical maser cavities are well known in the art, as evidenced by U.S. Patent 3,055,257 which issued September 25, 1962 to Boyd et al. and U.S. Patent 2,929,922 which issued March 22, 1960 to Schawlow et al. The Boyd et al. patent used spherical mirrors at the ends of its cavity and the Schawlow et al. patent used planar parallel mirrors as its end reflectors. In such prior art teachings, it is intended that the lasing cavity act to produce multiple reflections of light so as to achieve the requisite optical energy density for sustained generation of coherent waves. Such cavities were designed to generate maximum emission into a single optical mode. Such single optical mode was a fundamental property or characteristic of the specific optical cavity employed. Moreover, in such two mirror systems exemplified by Boyd et al. and Schawlow et al. the field amplitudes generated were taken to be identical on each of the facing mirrors of the cavity.

In the present device the maser optical cavity is chosen to be degenerate in the sense that many optical modes of equal loss may exist within the cavity. That is, one of the mirrors of the cavity could be considered to be divided into small subsections wherein each subsection represents a mode so that optical maser oscillation can occur equally well at each section. The oscillation of the optical maser is determined by the diffraction transformation used in the theory of coherent image formation. Thus the field amplitude at one surface are diffraction transformed into similar but not identical amplitudes upon the facing mirror surface that forms the other end of the lasing cavity.

Means are provided for imaging small objects which obstruct the laser light within the cavity onto one of the mirrors of the cavity. The images so formed may possess a resolution of their edge detail that is greatly superior to the resolution that would be obtained with passive diffraction limited image formation techniques. In general, this multimode or imaging capability is utilized by the insertion of apertured masks within the laser cavity, or the insertion of actual objects in that cavity, or by the use of controls, e.g., electrooptical devices such as a Kerr cell, capable of selecting prescribed field amplitude distributions so that the optical maser may generate such field amplitude distribtuions. In short, the reflectivity of selected areas of one of the mirrors of the optical maser cavity is disturbed or otherwise interfered with so that stimulated emission can only build up in selected areas.

Thus, it is an object of this invention to provide a novel maser optical cavity.

It is another object to provide an optical maser cavity wherein the reflectivity of one of the mirrors of said cavity can be modified during the operation of the maser cavity.

It is yet another object to selectively enhance or destroy the reflectivity of a mirror of an optical maser cavity so as to control optical maser field distributions e.g., character projection.

It is still another object to obtain field configurations which result when objects are placed within an optical maser cavity.

It is yet another object to obtain images of objects placed within a maser optical cavity by projection and refocussing of the output optical maser energy whereby such imaging is superior to that obtainable by conventional optical means.

The foregoing and other objects, features and advantages of the invention will be apparent from the following more particular description of preferred embodiments of the invention as illustrated in the accompanying drawings.

Figure 1:
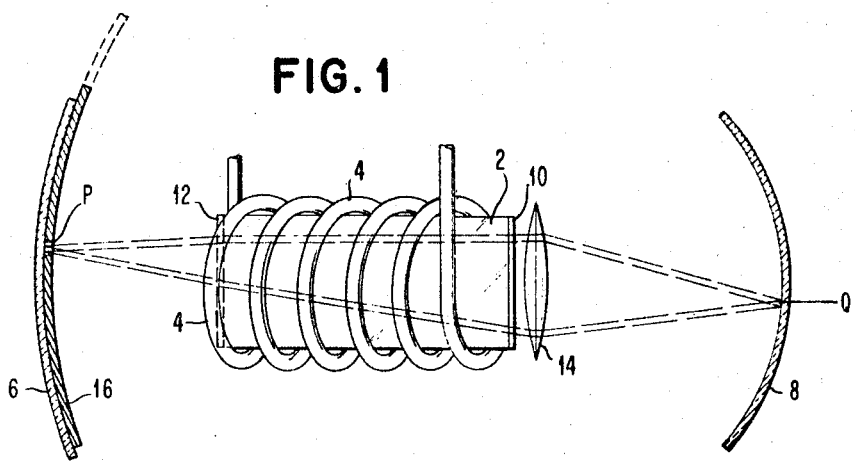
FIGURE 1 is an embodiment of the optical maser cavity employed in this invention.

In FIGURE 1, there is shown a laser medium 2 which serves as an active medium producing optical gain. Although any laser medium producing optical gain can be used, laser medium 2 is chosen as a continuously operated helium-neon gas laser 2 and 4 is an exciting source that supplies pumping energy thereto. Mirror 6 and mirror 8 constitute high reflectivity surfaces which provide the repetitive reflections of light through laser medium 2 so that a point P on mirror 6 is consecutively imaged at point Q on mirror 8 and then reflected back upon itself at point P. Such buildup of reflected waves is necessary to produce a high optical energy density needed to support lasing activity. Anti-reflection transparent layers 10 and 12 are coated onto the walls of the gas laser tube so as to minimize the loss of energy going into the laser medium 2 during such repeated reflections. Lens 14 serves to image upon mirror 8 a given distribution of electromagnetic energy at the surface of mirror 6; it also serves to re-image, when reflected by mirror 8, such electromagnetic energy at precisely the point of origin at mirror 6. If a mask 16 having an aperture therein were to be placed contiguous with or close to mirror 6 so that the reflectivity of mirror 6 were destroyed save at the aperture, an image of such aperture would appear at the mirror 8. The relationship of mirrors 6 and 8 and lens 14 follow the conventional optical relationship $$\frac{1}{R_1}+\frac{1}{R_2}=\frac{1}{f}$$

where $f$ is the focal length of lens 14 and $R_1$ and $R_2$ are the respective radii of mirrors 6 and 8. Both faces of lens 14 should also be coated with anti-reflection material to reduce transmission loss by lens 14 of the reflecting light from mirrors 6 and 8, but such coatings are not necessary for the practice of the invention. High reflectivity minimum areas for certain laser oscillations depend on the gain of the laser medium. A helium-neon laser allows oscillations into an area of a diameter approximately equal to 2½ Airy disk diameters. The Airy disk diameter $$D_A = \frac{2.4\lambda}{a} R$$

where $\lambda$=wavelength, $R$=separation of mirror 6 and lens 14, and $a$ is the diameter of the aperture of lens through medium 2. The value of $a$ for helium-neon gas laser is approximately the diameter of the discharge tube that forms the active medium 2.

Figure 2:
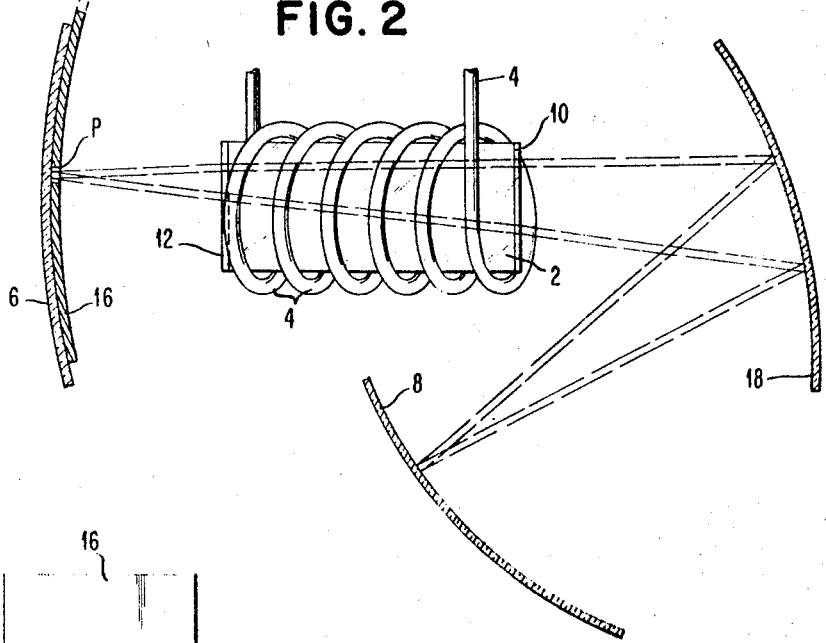
FIGURE 2 is a similar optical maser cavity with a mirror replacing a lens and a mask abutting against one of the outer mirrors of said cavity.

In FIGURE 2, lens 14 is replaced by a highly reflective mirror 18, the mirror 18 serving to cut down the light absorption of lens 14 and thus increase the efficiency of the system as a whole. The apertured mask 16 can be placed anywhere along the surface of mirror 6 to produce an image of the apertures in the mask on mirror 8. It is understood that the full energy output of the laser 2 is generated in the images of the apertures projected onto mirror 8. Consequently such images are constituted of extremely monochromatic energy and possess a brightness order of magnitude greater than could be obtained by conventional light sources.

Figure 3A:
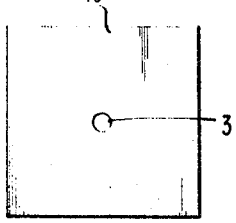
FIGURES 3a, 3b and 3c are typical masks useable with the invention.
Figure 3B:
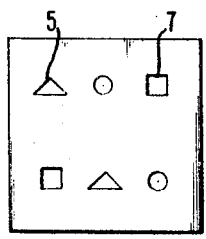
Figure 3C:
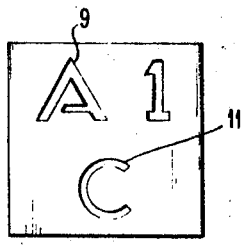

FIGURES 3a, 3b, 3c are representative masks 16 that could be used to limit the high reflectivity area of mirror 6 to the shape of the openings 3, 5, 7, 9, 11, etc. so that the mirror 8 would support either a single image of aperture 3, or plural images such as 5, 7, etc. or 9, 11, etc., depending up which mask 16 is inserted into the laser cavity.

Figure 4:
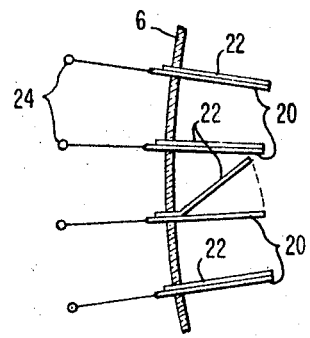
FIGURE 4 is an embodiment of the invention depicting an electrostatically operated mask abutting one of the outer mirrors of said cavity.

Masks 16 were shown to illustrate the operation of the invention and are not meant to set forth the actual manner in which the invention will be utilized as a practical device in FIGURE 4, there is shown an electromechanical technique for selectively spoiling the high reflectivity surface of mirror 6 (see FIGURE 2) to produce various image patterns on mirror 8. A plurality of rods 20 is inserted through mirror 6 from which they are insulated and each rod 20 has a metal leaf 22 associated therewith. A matrix, not shown, can supply potentials to input terminals 24, the presence of a potential at a terminal 24 causing its associated leaf 22 to be repelled and move in the manner that the leaf of an electroscope would move. The extended leaf 22 would prevent any light from impinging upon mirror 6 and thus serve to cut off any oscillations that might have existed on the mirror surface prior to the extension of the leaf 22. In this manner, various patterns can be imaged on mirror 8, depending upon which rods 20 have been selected to receive a potential at its respective input terminals 24.

Figure 5:
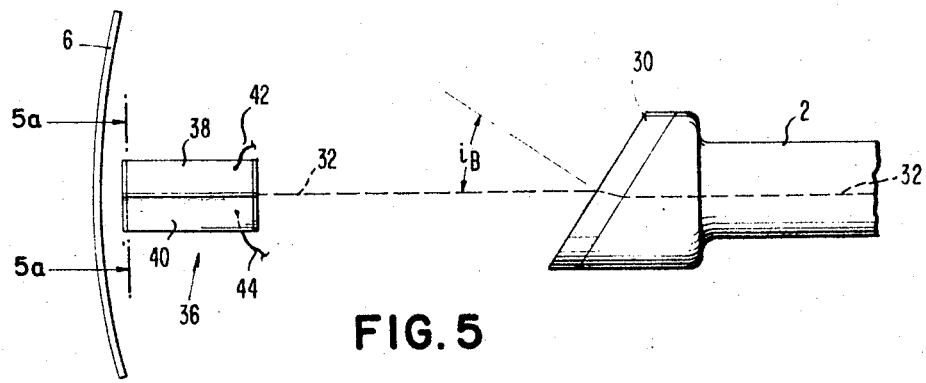
FIGURE 5 is a further embodiment of the invention being employed as an electrooptically controlled image projector.
Figure 5A:
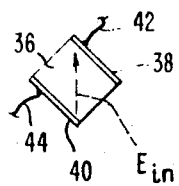
FIGURE 5a is a view of the electrooptical polarizer as seen from one of its end faces.

FIGURE 5 sets out an electrooptical means for obtaining selective destruction of reflectivity at one surface of a mirror and since only the left portion of FIGURES 1 and 2 is modified in obtaining such electrooptical means, only enough of the device of either FIGURE 1 or FIGURE 2 is shown to illustrate the invention. The window 30 of the helium-neon gas laser 2 is set at the Brewster angle $i_B$ whereby the relationship $\tan i_B = n$ for maximum polarization exists and $n$ is the index of refraction of window 30. The lasing light 32 will hit window 30 and be refracted in the window 30 and pass out as polarized light to impinge on an electrooptical light modulator 36. An example of such light modulator would be a flat, polished plate of a crystalline and suitably oriented material such as ammonium dihydrogen phosphate (ADP) or potassium dihydrogen phosphate (KDP). Other crystals or liquid cells could be employed, but they should have the characteristic of rotating the plane of polarization of the beam 32 when they are placed in the path of such polarized light and a voltage is applied to opposite faces of such crystals or liquid cells. In the present case, thin metallic layers 38 and 40 (see FIGURE 5a) are placed across opposite faces of crystal 36, and leads 42 and 44 are suitably attached to a source of potential.

As can be readily seen, the crystal 36 is placed between mirror 6 and window 30 and serves as a shutter. The cell 36, without a potential applied to its metal coatings 38 and 40, will transmit beam 32 (polarized as shown by E in FIGURE 5a) through it so as to cause the latter to impinge on mirror 6 and be reflected back through the crystal 36 into the laser medium 2 without rotation of the plane of polarization and without loss of energy on transmission of beam 32 through crystal 36. The application of a potential via leads 42 and 44 to crystal 36 will cause a rotation of the plane of polarization, effecting losses with respect to transmission through the Brewster angle windows 30 acting as polarizers with respect to any polarizing media that may be placed within the cavity. Said loss is sufficient to inhibit and suppress laser oscillation. Thus, the reflectivity of an area on mirror 6 is altered by the state of the KDP crystal 36.

Figure 6:
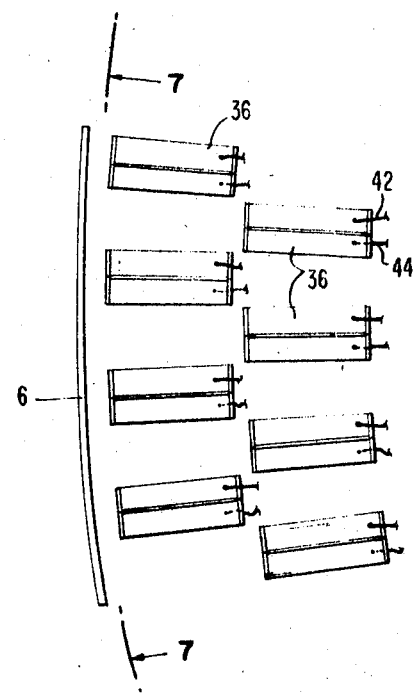
FIGURE 6 is a showing of an array of electrooptical switches used with the embodiment of FIGURE 5 to obtain a variety of projected images.

It is to be understood that the crystal 36 can alternatively be oriented so that the plane of polarization of light beam 32 is rotated when there is no potential on plates 38 and 40, preventing repeated reflections from taking place through crystal 36. Now, when a potential is placed across said crystal 36, the plane of polarization of beam 32 is rotated to reduce the above noted losses so as to permit lasing action. Consequently, a voltage signal applied to plates 38 and 40 may be used to create a dark or a light image, depending upon the original relationship of cell 36 with respect to the window 30 of the gas laser tube. Insofar as the degree of rotation produced by the electrooptical crystal 36 is only required to introduce sufficient loss to inhibit the buildup of laser oscillation, the requisite electrical energy applied to the crystal 36 is considerably less than is needed to effect the full 90° rotation that would be needed for 100% modulation of an external light beam that passes through a polarizer and an electrooptical crystal as 36.

Where an array is desired, a plurality of crystals or cells may be used as shown in FIGURE 6. As seen in FIGURE 6, such cells can be offset from one another whenever a high density of crystals 36 is used so as to obtain a raster of cells that will yield a high resolution image on the face of one of the mirrows 6 or 8. The cells may be placed at distances up to $\frac{1}{10}$ a radius of curvature from the controlled mirror 6 surface and such disposition minimizes the chance of a cell being affected by fringing fields of an adjacent cell. The wires or leads 42 and 44 leading from the outside of the laser cavity to plates 38 and 40 can be taken out of the cavity so that they are substantially parallel and planar with the edges of crystals 36 so as to negligibly interfere with the high reflecting areas of mirror 6 with respect to laser beam or beams 32.

Figure 7:
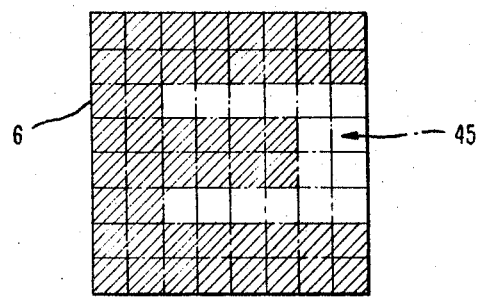
FIGURE 7 is a front view of that end mirror of the optical maser cavity on which an image is formed.

FIGURE 7 illustrates an 8 x 8 array of crystals or cells 36 forming the letter E. The raster 45 indicates that the entire surface of mirror 6 is reflective when there is no potential applied to any of the crystals 36. Image formation takes place by applying potentials to selected crystals 36, the latter serving to selectively destroy reflectivity at mirror 6; the image, such as the letter E, then appears as a dark image against a bright background. A representative raster would have an 8 x 8 or a 10 x 10 array of resolvable spots that are individually controlled, with a character switching time of the order of 10 microseconds, permitting a projection rate of $10^5$ images per second. A spot selection energy of 0.1 microjoule or less is required for actuating the crystals 36

Figure 8:
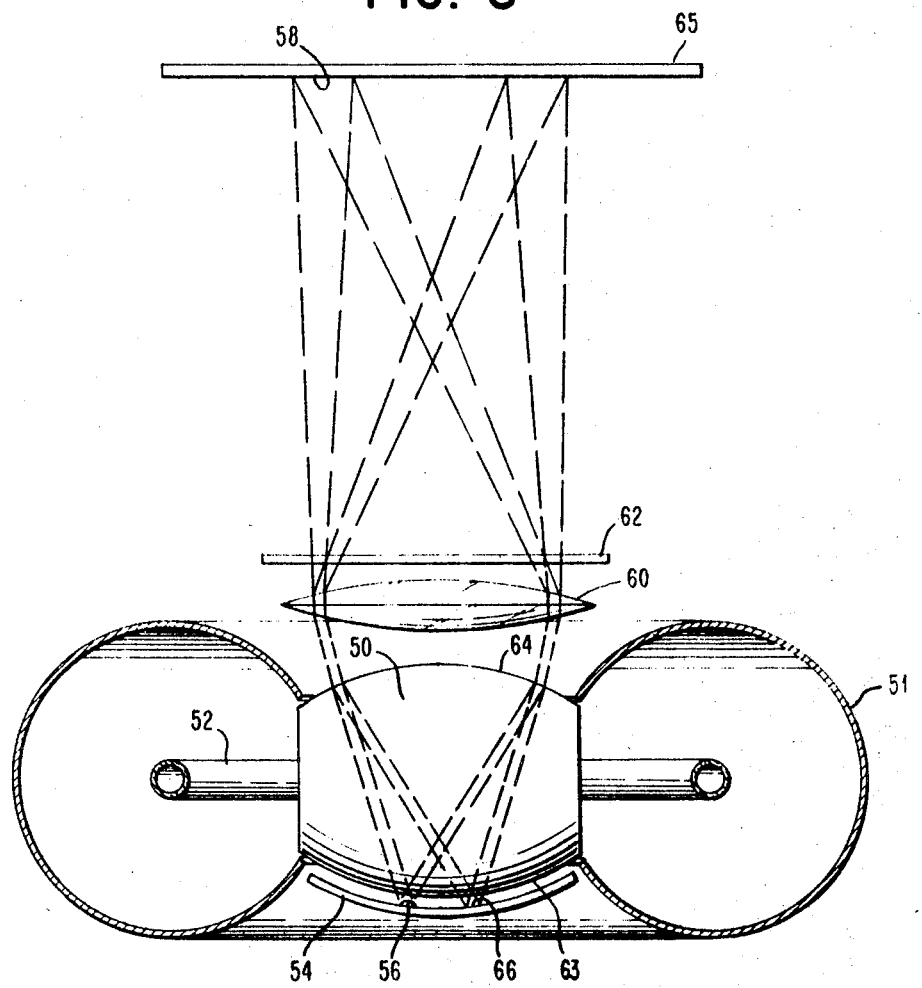
FIGURE 8 is a teaching of the invention as it is applied to microscopy.

In FIGURE 8, the principle of this invention is applied to the field of microscopy. In this illustration, 50 is a solid laser such as ruby or neodymium doped glass and 52 is a flash lamp encircling the solid ruby 50 and supplies pumping energy to ruby 50. Reflector 51 concentrates the light from lamp 52 onto the ruby laser 50. Surface 64 of the laser crystal is a highly reflecting spherical surface, comprising one mirror of the optical cavity system. The other surface 63 of the crystal is made highly transmitting, but the reflecting surface of the overall laser cavity is completed by a highly reflecting mirror 54; this arrangement facilitates the insertion of an object 56 into the optical maser cavity and mirror 54 acts as a support for said object 56. Reflecting mirrors 64 and 54 are to be confocally disposed, with surface 64 acting to reflect and refocuss the optical maser field back towards mirror 54. In this manner an image of object 56 is formed at position 66 of FIGURE 8 and is located at a conjugate image position for object/image formation in mirror 64. (These confocally disposed mirrors 54 and 64 are a special case of FIGURE 2 in which mirrors 6 and 8 become a common surface and the imaging takes place entirely within and through the active medium.) Image 66 and object 56 appear as two magnified images 58, only one of which is shown, on screen 65. Lens 60 is a conventional magnifying lens and 62 is a filter that filters out light from source 52 but transmits lasing light from ruby 50.

This operation achieves a large numerical aperture, the latter being desirable in microscopy to enable the resolution of fine detail in the image of the object 56. Moreover, additional resolution is provided with respect to that which would be available in normal microscopy in which an active medium is not employed, resulting in greater ability to distinguish two separate objects as separate in their potical images. The wave fields that result from optical maser action when an object is placed within said optical cavity can be extracted by partial transmission through either mirror 54 or 64 and passed through conventional optical microscopes to magnify and project or photograph the resultant image.

The present invention provides the basis for character projectors, photorecording, microscopy, scanning techniques, display devices, etc. In general, many optical devices that are constructed using conventional incoherent light are now capable of being manufactured using the advantages of laser light. Since the total laser volume is used rather than discrete "tubes" of light, more energy is available for use by the device to which this invention is applied.

While the invention has been particularly shown and described with reference to preferred embodiments thereof, it will be understood by those skilled in the art that various changes in form and details may be made therein without departing from the spirit and scope of the invention.

What is claimed is:

A pair of reflecting mirrors disposed to define an optical cavity,
  an active element disposed within said cavity and operative to coact with said cavity to produce a stimulated emission of light along a plurality of angularly disposed axes within said cavity,
  means for pumping said active element,
  a plurality of electrooptical elements arranged as an array between said active element and one of said mirrors,
  and means for selectively actuating a predetermined number of said electrooptical elements so as to modify the transmission of stimulated emitted laser light through said actuated elements, whereby a light pattern appears on one of said mirrors in accordance with said selection.

References Cited by the Examiner
UNITED STATES PATENTS 3,136,959 6/1964 Culver _____ 331—94.5
3,187,270 6/1965 Kogelnik et al. _____ 331—94.5
3,242,439 3/1966 Rigden et al. _____ 331—94.5

OTHER REFERENCES

Rigrod et al. "Gaseous Optical Maser with External Concave Mirrors" Applied Optics Supplement on Optical Masers, December 17, 1962, pp. 125, 126.

JEWELL H. PEDERSEN, *Primary Examiner.*

RONALD L. WIBERT, *Examiner.*